United States Patent
Steinberger et al.

(10) Patent No.: US 12,026,518 B2
(45) Date of Patent: Jul. 2, 2024

(54) DYNAMIC, LOW-LATENCY, DEPENDENCY-AWARE SCHEDULING ON SIMD-LIKE DEVICES FOR PROCESSING OF RECURRING AND NON-RECURRING EXECUTIONS OF TIME-SERIES DATA

(71) Applicant: Braingines SA, Fribourg (CH)

(72) Inventors: Markus Steinberger, Graz (AT);
Alexander Talashov, Lipetsk (RU);
Aleksandrs Procopcuks, Ventspils (LV); Vasilii Sumatokhin, Arzamas (RU)

(73) Assignee: BRAINGINES SA, Fribourg (CH)

( * ) Notice: Subject to any disclaimer, the term of this patent is extended or adjusted under 35 U.S.C. 154(b) by 0 days.

(21) Appl. No.: 17/931,667

(22) Filed: Sep. 13, 2022

(65) Prior Publication Data
US 2023/0123634 A1    Apr. 20, 2023

Related U.S. Application Data

(60) Provisional application No. 63/255,775, filed on Oct. 14, 2021.

(51) Int. Cl.
*G06F 9/38* (2018.01)

(52) U.S. Cl.
CPC .......... *G06F 9/3887* (2013.01); *G06F 9/3836* (2013.01); *G06F 9/3838* (2013.01); *G06F 9/3856* (2023.08)

(58) Field of Classification Search
CPC .... G06F 9/3887; G06F 9/3836; G06F 9/3838; G06F 9/3856; G06F 9/5038; G06F 9/4887
See application file for complete search history.

(56) References Cited

U.S. PATENT DOCUMENTS 8,572,586 B2   10/2013   Eichenberger et al.
9,436,504 B2    9/2016   Durant
(Continued)

FOREIGN PATENT DOCUMENTS

EP   2652597 B1   3/2018

OTHER PUBLICATIONS

Gallo; et al., "Efficient 3D Audio Processing with the GPU," in Proc. ACM Workshop on General Purpose Computing on Graphics Processors, Los Angeles, CA. USA, Aug. 7-8, 2004 (Aug. 2004), 1 pg.

(Continued)

*Primary Examiner* — Shawn Doman
(74) *Attorney, Agent, or Firm* — Ascenda Law Group, PC

(57) ABSTRACT

An apparatus for parallel processing includes a memory and one or more processors, at least one of which operates a single instruction, multiple data (SIMD) model, and each of which are coupled to the memory. The processors are configured to process data samples associated with one or multiple chains or graphs of data processors, which chains or graphs describe processing steps to be executed repeatedly on data samples that are a subset of temporally ordered samples. The processors are additionally configured to dynamically schedule one or multiple sets of the samples associated with the one or multiple chains or graphs of data processors to reduce latency of processing of the data samples associated with a single chain or graph of data processors or different chains and graphs of data processors.

14 Claims, 8 Drawing Sheets

(56) References Cited

U.S. PATENT DOCUMENTS

| | | | |
|---|---|---|---|
| 9,684,494 B2 | 6/2017 | Mizrachi et al. | |
| 9,900,378 B2 | 2/2018 | Zhang et al. | |
| 10,068,306 B2 | 9/2018 | Rao et al. | |
| 10,869,108 B1 | 12/2020 | Wu | |
| 2013/0086370 A1 | 4/2013 | Burger et al. | |
| 2013/0305250 A1* | 11/2013 | Durant | G06F 9/4881 718/102 |
| 2015/0026444 A1 | 1/2015 | Anderson et al. | |
| 2017/0083320 A1 | 3/2017 | Burger et al. | |
| 2017/0083338 A1 | 3/2017 | Burger et al. | |
| 2017/0083339 A1 | 3/2017 | Burger et al. | |
| 2018/0315159 A1* | 11/2018 | Ould-Ahmed-Vall | G06F 9/5044 |
| 2021/0304485 A1 | 9/2021 | Kaburlasos et al. | |

OTHER PUBLICATIONS

Hsu; et al., "Finite difference-based sound synthesis using graphics processors," ACMQueue (2013), pp. 1-16.

Lazzarini; et al., "Streaming spectral processing with consumer-level graphics processing units," in Proc. 17th Int. Conference on Digital Audio Effects (DAFx-14), Erlangen, Germany, Sep. 1-5, 2014, 8 pgs.

Mišić; et al., "Evolution and Trends in GPU Computing," 2012 Proceedings of the 35th International Convention MIPRO (2012), pp. 302-307.

Plauth; et al., "FastICA on Modern GPU Architectures," 2014 15th International Conference on Parallel and Distributed Computing, Applications and Technologies (2014), pp. 69-75.

Renney; et al., "There and Back Again: The Practicality of GPU Accelerated Digital Audio," Proc. Int'l Conf on New Interfaces for Musical Expression (NIME '20), Birmingham, UK, Jul. 21-25, 2020, 6 pgs.

International Search Report and Written Opinion mailed Nov. 22, 2022, from ISA/European Patent Office, for International Patent Application No. PCT/IB2022/058634 (filed Sep. 13, 2022), 15 pgs.

Steinberger, "On Dynamic Scheduling for the GPU and its Applications in Computer Graphics and Beyond", IEEE Computer Graphics and Applications, May 1, 2018, 38(3):119-130.

Wilson; et al., "Dynamic warp formation: Efficient MIMD Control Flow on SIMD Graphics Hardware", ACM Transactions on Architecture and Code Optimization, Jun. 2009, vol. 6, No. 2, article 7, 37 pgs.

Zhou; et al., "S3DNN: Supervised Streaming and Scheduling for GPU-Accelerated Real-time DNN Workloads", 2018 IEEE Real-Time and Embedded Technology and Application Symposium, Apr. 11, 2018, pp. 190-201.

* cited by examiner

DYNAMIC, LOW-LATENCY, DEPENDENCY-AWARE SCHEDULING ON SIMD-LIKE DEVICES FOR PROCESSING OF RECURRING AND NON-RECURRING EXECUTIONS OF TIME-SERIES DATA

RELATED APPLICATIONS

This is a NONPROVISIONAL of, claims priority to, and incorporates by reference U.S. Provisional Application No. 63/255,775, filed 14 Oct. 2021.

FIELD OF THE INVENTION

The present invention relates to processing systems and, more particularly, to one or more techniques for scheduling repeated processing steps on data streams on parallel processors with a focus on low-latency execution and audio processing.

BACKGROUND

Digital audio represents sound as discrete, quantized samples to be processed by digital compute resources. Digital audio processing applications are computationally intensive tasks often addressed using conventional central processing units (CPUs) or digital signal processors (DSP). One reason such processing applications are computationally intensive is because digital audio data often must be processed in "real-time," that is, as the digital audio data is input to a processing unit, providing near-instantaneous output. Real-time processing generally entails the need for a program to meet a set of performance requirements consistently for a particular application. In the case of digital audio data, it is usually the case that a consistent number of audio samples needs to be processed every successive time period. Because of the nature of the data, even a few missed samples or processing delays can result in instantly noticeable effects in an output audio stream. Similarly, latency (the delay between the initiation of an event and its conclusion) and variations in latency in real-time applications often lead to unacceptable results.

In addition to CPUs and DSPs, graphics processing units (GPUs) are known digital compute resources. GPUs are specialized processors designed originally to accelerate graphics rendering. FIG. 8 illustrates an example of a GPU 800, which can be described as a hierarchical multi-processor consisting of a number of streaming multi-processors (SMs) 802, each of which contains a number of streaming processors (SPs) 804. An SM 802 can execute large numbers of threads simultaneously, with each thread running the same program; hence, this arrangement is often referred to as a single instruction multiple thread (SIMT) architecture. SMIT architectures find particular application in situations involving a high degree of data parallelism, where the same operations are applied to large amounts of data (e.g., image processing). When paired with a CPU host, the GPU executes assigned jobs independently of the host, either synchronously or asynchronously, and returns the results to the host.

A function that is executed in parallel by the GPU is called a kernel. A kernel is executed in parallel by threads grouped into blocks. One or more blocks are assigned to an SM such that threads in the same block are executed on the same SM. Each thread executes the same kernel function, but usually on different data. Different blocks typically cannot be synchronized within a kernel and are not guaranteed execution order by any particular SM.

In most GPUs, a hierarchy of memory exists, with registers being accessible to a thread, a limited amount of shared memory 806 accessible to threads in a block, and larger but slower global memory 808 accessible to all threads in any block. Newer GPUs may also provide caches at the level of the SMs.

While apparatuses such as those illustrated in FIG. 8 are throughput-oriented, their design typically does not lend itself to a latency-oriented execution. This is because of the compute core design, where latency hiding is used, the hardware scheduler, which dispatches large compute kernels that oversubscribe the compute cores, and the software stack, which introduces latency when launching the execution on such devices.

U.S. Pat. No. 9,436,504 describes an enhanced way for GPUs to queue new computational tasks into a task metadata descriptor queue. Individual processing units may be configured to execute a large number of threads in parallel. In some cases, single-instruction, multiple-data (SIMD) instruction issue techniques are used to support parallel execution of a large number of threads without providing multiple independent instruction units. In other instances, SIMT techniques are used to support parallel execution of a large number of generally synchronized threads, using a common instruction unit configured to issue instructions to a set of processing engines. There is no mention of dynamic schedule processing of sets of data samples that considers priority or execution deadline as well as required resources for the processing of the sets of data samples.

US PGPUB 2012/10304485 describes rendering of stereoscopic images by a parallel processor through generation of separate left-eye and right-eye images. There is no mention of processing of audio data or dynamically scheduled processing of sets of data samples by chains or graphs of data processors.

U.S. Pat. No. 9,684,494 describes the use of multiple processing elements having execution dependencies and the compiling of compute tasks for execution on such devices. The disclosed system relies on both a CPU and GPU to execute the compiled tasks. Scheduling is based on statistical methods and employs a database to manage execution ordering of tasks.

U.S. Pat. No. 10,869,108 describes parallel processing of audio channels such as those involved in telephony systems. A parallel digital signal processing architecture allows for operations such as echo cancelling, signal detection, and related functions. However, there is no mention of dynamic schedule processing of sets of data samples by the chains or graphs of data processors, such as dynamic schedule processing that considers priority or execution deadline as well as required resources for the processing of the sets of data samples.

U.S. Pat. No. 10,068,306 describes dynamic allocations of workload in a GPU for graphics processing, however, does not mention such a process taking into account priorities or execution deadlines of data samples. Instead, only processing dependencies are considered.

Lazzarini et al., "Streaming spectral processing with consumer-level graphics processing units," discusses an implementation of a streaming spectral processing system for real-time audio in a consumer-level GPU attached to a laptop computer. The development was done using NVIDIA's CUDA development environment and involves conventional Discreet Fourier Transform (DFT) methods to analyze time domain data in the frequency domain. There is no mention of any dynamic schedule processing that accounts for priority or execution deadline as well as required resources for processing sets of data samples.

SUMMARY OF THE INVENTION

In various embodiments, the present invention provides an apparatus for parallel processing that includes a memory and one or more processors, at least of which operates a single instruction, multiple data (SIMD) model, and each of which are coupled to the memory. The processors are configured to process data samples associated with one or multiple chains or graphs of data processors, which chains or graphs describe processing steps to be executed repeatedly on data samples that are a subset of temporally ordered samples. The processors are additionally configured to dynamically schedule one or multiple sets of the samples associated with the one or multiple chains or graphs of data processors to reduce latency of processing of the data samples associated with a single chain or graph of data processors or different chains and graphs of data processors. Different sets of the data samples may be of equal or a different number of samples, each set of samples maps to multiple processing threads, and the same or different processing steps may represent different data processors.

The dynamic scheduling is performed, in one embodiment of the invention, in separate configuration and processing phases. During the configuration phase, a scheduling blueprint is derived and stored for the processing phase. The scheduling blueprint may contain information required for the execution of individual processing tasks as well as information about where data should be placed in different memory buffers, such as input, output, and temporary buffers, as well which information needs to be updated and where before execution. For the execution phase, a parallel distributed scheduler makes scheduling decisions independently for each processor and a set of queues is maintained in shared memory to manage tasks ready for execution across the various processors. The scheduler assigns tasks to processors from the queues and executes the function associated with each task using the resources of the processors. After the execution of a task, the scheduler examines dependencies of the finished tasks, updates associated dependency counters, and assigns tasks ready for execution to a work queue.

These and further embodiments of the invention are described below.

BRIEF DESCRIPTION OF DRAWINGS

The present invention is illustrated by way of example, and not limitation, in the figures of the accompanying drawings, in which.

DETAILED DESCRIPTION

Figure 1:
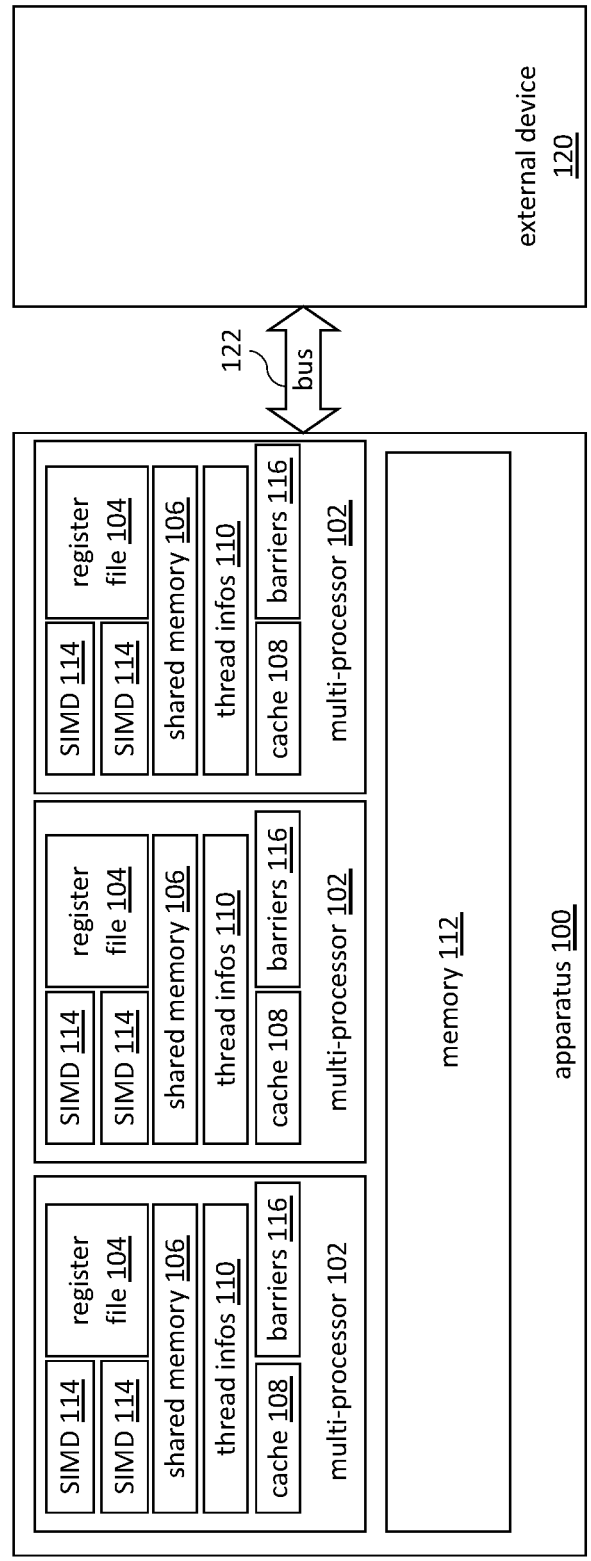
FIG. 1 illustrates an example of an apparatus for parallel processing, configured in accordance with some embodiments of the invention.

In the following detailed description of various embodiments of the invention, reference is made to the accompanying drawings that form a part hereof, and in which are shown by way of illustration specific embodiments in which the invention may be practiced. It should be understood that other embodiments may be utilized and structural changes may be made without departing from the scope of the present invention. Descriptions associated with any one of the figures may be applied to different figures containing like or similar components.

In one embodiment, the present invention provides an apparatus for parallel processing that includes a memory and one or more processors, at least one of which operates a single instruction, multiple data (SIMD) model, and each of which are coupled to the memory. The processors are configured to process data samples associated with one or multiple chains or graphs of data processors, which chains or graphs describe processing steps to be executed repeatedly on data samples that are a subset of temporally ordered samples. The processors are additionally configured to dynamically schedule one or multiple sets of the samples associated with the one or multiple chains or graphs of data processors to reduce latency of processing of the data samples associated with a single chain or graph of data processors or different chains and graphs of data processors. Different sets of the data samples may be of equal or a different number of samples, each set of samples maps to multiple processing threads, and the same or different processing steps may represent different data processors.

In some embodiments, each of the one or more processors may be connected to a limited amount of resources, for example a register file, shared memory, thread state registers, named barriers, or shared caches. A pool of sets of data samples may be stored in the memory and each set of data samples may be associated with a priority or execution deadline. The scheduling of one or multiple sets of data samples to be processed may be based on the priority or execution deadline of all sets of data samples in the pool. In some embodiments, the scheduling of one or multiple sets of the data samples may consider the priority or execution deadline as well as resources required for processing of the samples, including one or more of a number of threads, registers, local shared memory, number of requires synchronization barriers, and execution time. The data samples may be associated with a pre-recorded, generated, or live-translated stream of samples forming an audio track.

In various embodiments, a pool of sets of the data samples may be organized in one or multiple queues or a hierarchy of queues, wherein each queue or node in the hierarchy may be associated with a different processor, launch, priority, resource requirement or a state. The state may be one of waiting for dependencies, ready to execute, executing, and finished, and the scheduling of sets of data samples may use the queues or hierarchy. Optionally, each queue may be sorted according to an additional priority or feature not captured in the hierarchy by the one or multiple processors.

In various embodiments, the chains or graphs of digital processors may be associated with one or more clients, and each client, graph, or chain may be associated with a processing quota or priority, which may be considered for scheduling.

The data samples may come from a storage device (e.g., a disc or other storage device), originate from an external source, such as a microphone, musical instrument, or other device (e.g., connected through analog to digital converters), or may be streamed through a network, or be made available through another processor that is associated with its own memory, such as a CPU, or originate from an external workstation, or a digital audio workstation (DAW) running on one or multiple connected processors.

Each data processor may be associated with one or more inputs and one or more outputs, where each input and/or output may consist of one or multiple channels and each channel consists of one or multiple samples. Further, each data processor may be associated with one or multiple tasks, and each task may be associated with different resource requirements, including a number of parallel processing threads, local shared memory requirements, registers, and/or a number of required barriers. The sets of samples in conjunction with their tasks may be combined to execute on the one or multiple processors to work within the limited resources available on the one or multiple processors. For example, a combination of samples and tasks may make use of the above-described queueing structure. Further, tasks may use thread counts smaller than a SIMD width of the one or multiple processors and multiple sets of samples for the same task may be combined to reach the SIMD width of the one or multiple processors.

In various embodiments, information about the one or multiple chains or graphs of data processors is computed upon changes to the graph(s) or processor(s) and samples are provided for each graph or chain with a higher frequency, splitting the processing into a configuration phase and an execution phase, where the configuration phase may be executed on the apparatus for parallel processing or on a different processor. Graph changes may include the addition or deletion of data processors, changes to the number of channels processed by the one or multiple data processors, input or output connection changes between the data processors being altered, changes to the data processors' tasks being made, and/or the number of tasks being altered. During the configuration phase of a chain or graph of data processors, possible execution of data samples and thus their flows through the chain or graph may be split into parallel and sequential processing, creating a dependency graph of tasks and data samples, where the set of data samples may be associated with samples being made available as input to the chain or graph or may only become available after the processing of a task associated with one or multiple data processors.

In some instances, each set of data samples may be made available as an input to the chain or graph or may become available after processing of a task associated with one or more data processors, and may be associated with a virtual memory location in a virtual memory buffer that may be realized only when new samples for the chain of the graph of data processor arrive, that is, before the processing phase of the chain or graph. The virtual memory location may consider the dependencies between data processors and the potentials of parallel execution and the virtual memory location may thus be overlapping to result in minimal memory requirements. Further, in some instances the dependency graph may be translated into a per-task dependency counter and a dependency pointer from depending task to dependent task. And, a virtual memory location may be reserved for each dependency counter, to enable the tracking of depending tasks and the state change of associated set of samples in the pool of samples, for example when a dependency counter reaches zero.

In some embodiments, all tasks contributing to sets of data samples that are considered outputs of the chain or graph of data processors are associated with a chain or graph completion counter, capturing the number of tasks that need to finish execution such that the entire chain or graph is considered finished. Further, all task information, input and output data locations, task and data processor parameters and resource requirements, task dependency pointers and counters, and virtual memory locations may be combined into a per-chain or per-graph processing blueprint, which includes all information present in the configuration phase and information about all virtual memory locations and relative memory offsets between data associated with each task of each data processor which may be inserted before the processing phase.

In some embodiments, execution on the apparatus for parallel processing may be split into continuous processing steps, wherein during each processing step available sets of data samples from the pool of sets of data samples are processed. The duration of one or more processing steps may be limited by a predefined time frame, a fixed number of processor clocks, the completion of one of the multiple chains or graphs of data processors, or a combination of the foregoing. The completion of one or more chains or graphs of data processors may be tracked by the chain or graph completion counter(s). The execution of processing steps may be triggered by a secondary processor connected to the apparatus for parallel processing, and the apparatus for parallel processing may communicate the completion state of processing steps to the secondary processor. Further, the secondary processor may perform one or more processing steps "on the fly" to hide the communication latency from and to the apparatus for parallel processing. Graphs and chains may be associated with one or more threads executing on the secondary processor to allocate memory on the secondary processor and on the apparatus for parallel processing to turn a blueprint into an executable description and insert incoming data samples into the executable description. Also, each thread may associate an executable description with a first and a last processing step, where all tasks associated with a chain or graph of data processors are executed during processing steps taking place between the first and the last processing step. The last processing step may be derived from an expected execution time of a chain or graph of data processors, as well as an execution time associated with each processing step.

Data movement from the secondary processor to the apparatus for parallel processing may be associated with the first processing step and data movement from the apparatus for parallel processing may be associated with the last processing step. The data movement from the secondary processor to the apparatus for parallel processing associated with a first processing step may be overlapped with a processing step before the first processing step and the data movement from the apparatus for parallel processing associated with the last processing step may be overlapped with a processing step after the last processing step. The processors of the apparatus for parallel processing may be activated and deactivated based on an estimated amount of parallelism present in all chains and graphs of data processors whose first processing step is before a current processing step or coincides with the current processing step and the last processing step may be the current processing step or may be after the current processing step. Additional large output data may be associated with any processor or task and collected in a separate memory location and transferred from the apparatus for parallel processing asynchronously with the execution of the processing steps and may overlap with the processing steps after the last processing step associated with the chain or graph the task producing the large output data.

1. Apparatus and Processor Design

Embodiments of the invention provide an apparatus for parallel processing with a focus on throughput and methods to execute repeating execution tasks with low latency requirements on such an apparatus. One example of such an apparatus is a GPU, however, similar throughput-oriented designs may also be instantiated in CPU-like devices, DSPs, systems-on-chip (SOC), programmable logic devices (PLDs), application-specific integrated circuits (ASICs), field-programmable gate arrays (FPGAs), and/or other custom digital processing devices.

As shown in the illustration, an apparatus for parallel processing 100 configured as in embodiments of the present invention may be communicatively connected to an external device 120 over a high throughput and/or low latency bus 122. The apparatus has dedicated memory 112 for storing shared data and/or instructions and processing on the apparatus is parallelized across a number of multi-processors 102, each containing one or more SIMD cores 114. As indicated, each multi-processor 102 may offer a limited set of resources, such a shared register file 104, shared memory 106, information about the active/idle threads 110, a cache 108, a set of useable barriers 116, etc. Below we describe how this throughput-oriented hardware design can be used for parallel operations with tight latency requirements. It is noted that access to more distant memory or caches may (e.g., on apparatus 100 or a remote device) lead to memory fetch delay and instructions may incur a delay as well. These delays may be hidden by switching to other ready-to-execute groups of threads.

The processing cores 102 of apparatus 100 may operate in a SIMD fashion or an SIMT manner. Such processing systems may be efficient in executing the same instruction for multiple threads or lanes. Typically, the SIMD width, i.e., the number of such lanes, is small in comparison to the size of the complete device, e.g., 16 or 32 while the overall number of cores may reach multiple thousands. The coupled cores may be organized hierarchically, where, as shown, a number of SIMD units may be organized into a multi-processor and one or more multi-processors make up the computing device.

2. Processing Graph

Figure 2:
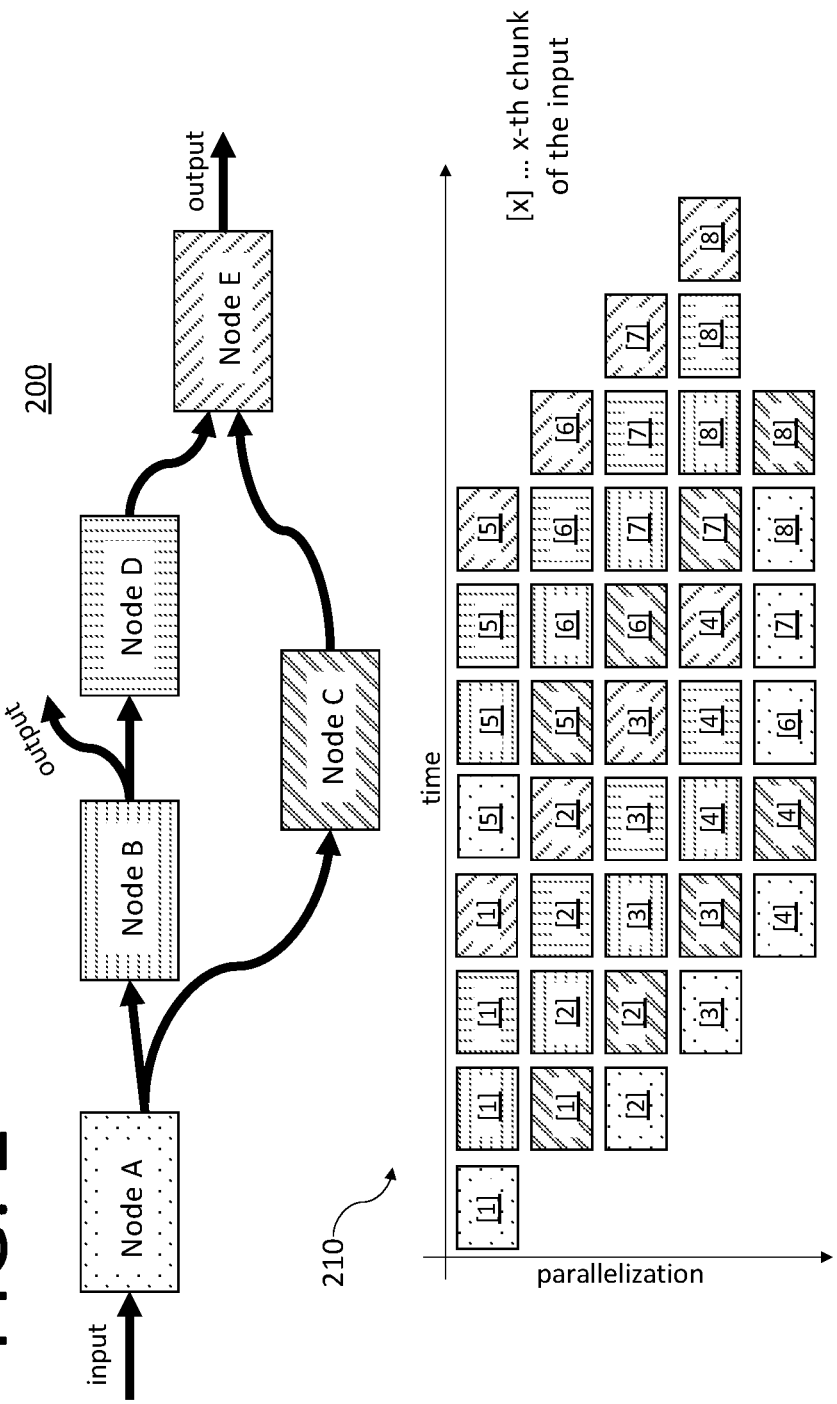
FIG. 2 shows an example of an execution graph for an apparatus for parallel processing such as that illustrated in FIG. 1, in accordance with some embodiments of the invention.

Referring now to FIG. 2, which shows an example of an execution graph 200, aspects of the present invention focus on repeated sequences of operations. Such operations may be described by a directed acyclic graph (DAG). Each node (A-E) in the graph describes a compute operation, or set of operations, which may offer a small degree of parallelism, e.g., for 16 to 256 threads/lanes, and which is/are executed on a fixed size input data array. The edges of the graph may describe sequences of data, where each node may consume (operate on) a certain amount of such data (a chunk) at a time and may output (create) another amount of data after the processing has finished. These processing portions must be strictly ordered and executed in sequence, i.e., the processing steps carried out by one node on a subsequent portion of the data may only be executed after the processing of a preceding portion of the data has been completed. Thus, each node (sometimes referred to herein as a processing node) can store an internal state and update such a state during execution. Thus, the execution is not side-effect-free. However, communication between processing nodes is only supported through the edges of the DAG. Thus, the execution of different nodes in the graph can be parallelized if input data for the nodes is available. Note that there is no restriction on the size of input data and output data and splicing of the data, i.e., one processing node may require multiple execution steps to provide sufficient data for a single execution of the next processing node. Given this arrangement, analyzing the graph provides information about the potential parallel execution of graph nodes which themselves offer parallelism.

The lower part of FIG. 2 shows a dependency graph 210, illustrating a potential execution order if all nodes (A-E in the present example) operate on equally sized chunks and eight calls to each node are necessary to finish the execution. In the illustrated example, processing operations of each of the nodes from the execution graph 200 are identified by corresponding shading of the processing operations of dependency graph 210. The data being operated upon per processing step is identified by bracketed numbers, e.g., [x], where [x] represents the xth chunk of the data being processed. The arrangements of operations in execution graph 200, that is, the manner in which the nodes are interconnected by the edges, dictate those of the processing operations that can be performed in parallel and those that cannot. If a node has multiple input edges, the node may consume data at different rates from all incoming edges and produce data to multiple output edges at different rates as well, e.g., one processing execution may consume 64 bytes from input one, 32 bytes from input two, and produce 8 bytes of output for output one and 128 bytes for output two.

From the above, it should be apparent that one embodiment of the present invention is an apparatus for parallel processing that includes a memory and one or more processors, each of which is connected to a limited amount of resources such as register files, shared memory, thread state registers, named barriers, and shared caches, and at least one of which operates a SIMD model, and each of which are coupled to a memory. The processors are configured to process data samples associated with one or multiple chains or graphs of data processors, which chains or graphs describe processing steps to be executed repeatedly on data samples, which may be subsets of temporally ordered samples. As described below, in some instances the data samples are digital audio samples, and may be associated with a pre-recorded, generated, or live-translated stream of samples forming an audio track. The data samples may be stored in memory, e.g., after being obtained from a local or remote resource such as disc, an external source such as a microphone, a musical instrument, or another device (e.g., via an analog to digital converter), a network via a streaming connection, another processor or workstation (such as a digital audio workstation running on one or multiple connected processors), etc.

As will become apparent through the later portions of this description, the processors are additionally configured to dynamically schedule processing of one or multiple sets of the samples by the one or multiple chains or graphs of data processors to reduce latency of processing of the data samples associated with a single one of the chains or graphs of data processors or different ones of the chains or graphs of data processors. For example, the scheduling of the processing of the data samples (which may be done on a set of data samples-by-set of data samples basis) may consider priority or execution deadlines of the data samples (individually, as groups, or collectively) as well as required resources (e.g., a number of threads, registers, local shared memory, number of required synchronization barriers, and execution time) for the processing thereof. Different sets of the data samples may be of equal or a different number of samples, and each set of data samples may map to multiple processing threads. The same or different ones of the processing steps may represent different data processors.

Figure 3:
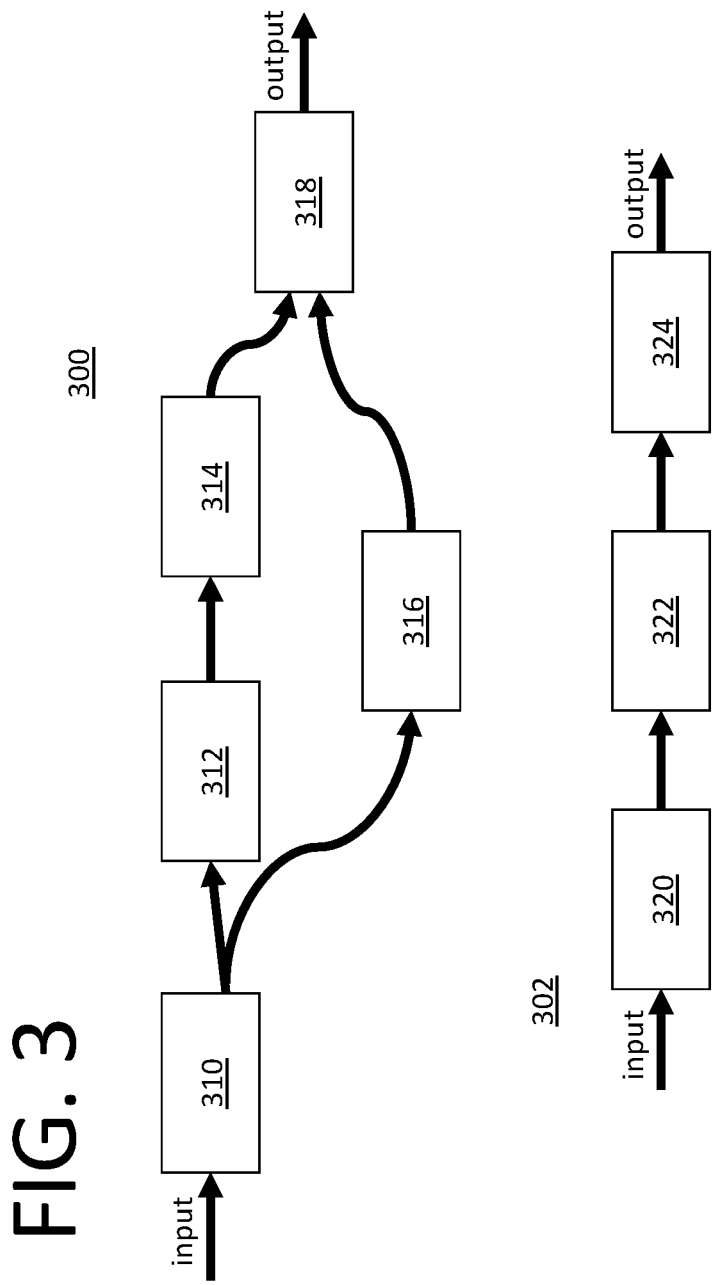
FIG. 3 shows an example of a processing graphs for processing digital audio data on an apparatus for parallel processing such as that illustrated in FIG. 1, in accordance with some embodiments of the invention.

As alluded to, an example of the above setup is chain of audio processors or a graph of audio processors. FIG. 3 shows two examples of audio processor chains or graphs, 300 and 302, in which each node (310, 312, 314, 316, 318, 320, 322, 324) corresponds to an audio processor. The edges of each graph or chain 300, 302 correspond to digital audio samples, and the processors (nodes) operate on a small number of samples at a time. In graph 300, the chain includes a fork (at the output of node 310) and a merging point, (at the input of node 318), whereas graph 302 corresponds to a simple effect (or linear) chain of nodes 320, 322, and 324. The digital audio samples (or, more generally, the data samples on which the present apparatus operates) may originate from a storage device (e.g., a disc or other storage device), from an external source, such as a microphone, musical instrument, or other device (e.g., connected through analog to digital converters), or may be streamed through a network, or the samples be made available through another processor, such as a CPU, or a DAW running on one or more connected processors (such as external device 120 in FIG. 1).

Audio processing requires low-latency, as recorded audio data being processed through a chain of effects needs immediate playback. Typically, only as little as a one millisecond delay is acceptable. To establish low-latency scheduling for such processing graphs, the processing graph may be analyzed once during a configuration phase and executed multiple times during a processing phase. The input for the processing phase may be provided all at once or become available only gradually. If the configuration of processing nodes or edges in the graph changes, or the consumed or produced sizes of data of individual processors changes, a configuration phase can be repeated. The configuration phase may rely on information from a previous configuration phase or completely run anew. Such graph changing operations may include the addition of processing nodes, the removal of processing nodes, the moving of processing nodes, adding or removing edges in the graph, changing the size of the input data, changing the number of inputs to the graph, or changing the number of outputs of the graph. Additionally, configuration changes to the processors may trigger another run of the configuration phase. Such changes may include the amount of input data consumed by a node, the amount of output data generated by a node, the number of inputs accepted by a node, the number of outputs generated by a node, the tasks performed by a node or alterations to those tasks, or changes to the resource requirements of a node.

Each node may be split into multiple processing tasks, which need to be executed sequentially. Each task may require different resources, such as different numbers of threads/lanes, different amounts of local shared memory, different numbers of synchronization barriers to synchronize subsets of threads/lanes, or different register file sizes. Changes to the resource requirements of each task may trigger another configuration phase.

Each edge in the graph may be associated with a multiplicity, indicating that multiple parallel streams of data may be input to a node or produced by a node. Each processing node may multiply the number of processing tasks depending on the input multiplicity, e.g., for an input with two parallel streams (for example stereo audio), one task taking both inputs or two parallel tasks each working on one of the parallel streams may be executed. However, the multiplicity may be chosen independently of the input multiplicity, e.g., an input with three parallel streams may use a multiplicity of two, or five, or any number.

The multiplicity of all tasks of a processing node is independent, i.e., all tasks may use a different multiplicity. Thus, the dependencies between execution steps must still be enforced, i.e., all multiplicities of one task on one set of inputs must be completed before the next task with its potentially different multiplicity can be executed. Note that the multiplicity of tasks can run in parallel. Also note that subsequent tasks on different input can also run in parallel, e.g., the second task on the first part on input data may run in parallel with the first task of the second part of input data (after the first task has finished processing on the first part of the input data).

3. Configuration Phase and Blueprints

During the configuration phase, a scheduling blueprint may be derived and stored (e.g., in a memory such as memory 112 of apparatus 100) for the processing phase. A scheduling blueprint may be derived in multiple steps, as in the following example.

A first step may analyze the input-output characteristics of all the processing graphs, creating order among processing nodes. The ordering includes the number of pure inputs, which are delivered from external sources, pure outputs, which will be returned after the processing of a graph is finished, and intermediates, which are only kept temporarily as outputs of one processing node and inputs for one or multiple other processing nodes. Outputs may also be used as temporaries, e.g., they may be input to one or multiple processing nodes but be returned after the processing of the graph has finished. Given a predefined length for all input data buffers, i.e., the amount of data required for a single execution of the graph, all buffer lengths may be determined by querying the input and output characteristics of all processing nodes.

A second step may determine the chunking of input and output data to determine the potential parallelism of subsequent processing nodes on different parts of the data stream. This chunking may be carried out using a queue of processing nodes, whose input chunking has been fully determined. If the chunking of all inputs of a processing node is determined, the processing node is queried to determine the number of task launches alongside their multiplicity and chunking of its outputs. If the chunking of an output is determined, the chunking for this data stream on the connected processing nodes inputs is set. When the chunking of all inputs is set, the processing node is added to the queue.

Upon starting of the step, all graph inputs are set to have their chunking defined as one single large chunk. After the queue is empty and all nodes have been processed, the step is completed. If nodes have not been visited, the graph may not be schedulable.

Figure 4:
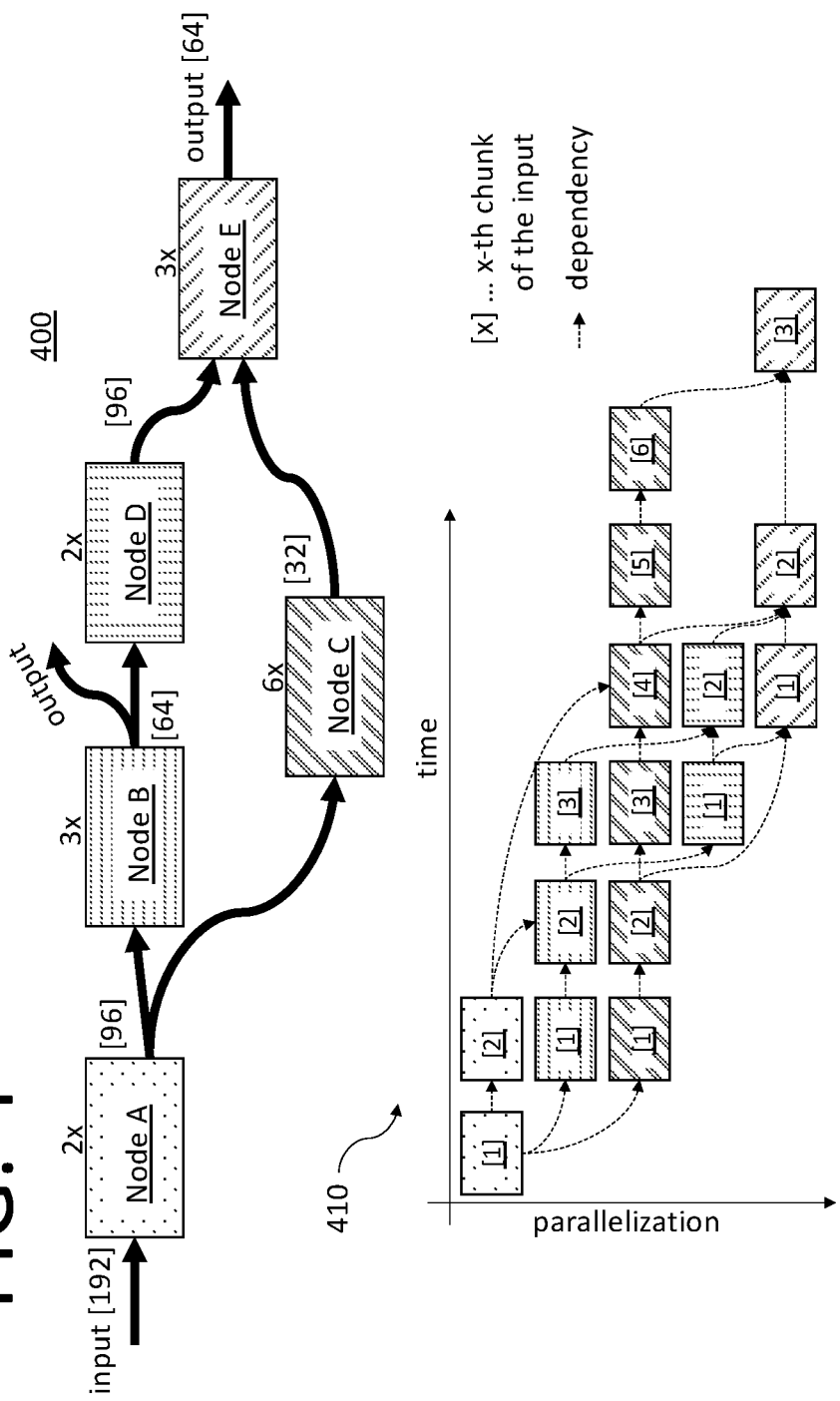
FIG. 4 shows an example of an execution graph with different chunking of the input data for an apparatus for parallel processing such as that illustrated in FIG. 1, in accordance with some embodiments of the invention.

FIG. 4 shows an example of an execution graph 400 with different chunking of the input, each corresponding to a different number of calls of that node. In this example, the input size is 192 samples. Node A works on 96 samples at a time, requiring two calls as shown in dependency graph 410. Node B operates on 64 samples leading to three calls, etc. This way of chunking results in a more complicated dependency graph 410 (illustrated in the lower part of the figure), which is solved in accordance with embodiments of the invention with a dynamic runtime dependency tracking.

The third step may determine the temporary buffer requirements and potential parallelism among processing nodes. To this end, the execution graph may be traversed from all processing nodes that only receive input data to the graph, analyzing the branching and merging within the graph. For each independent branch, a head of the potential parallel processing may be kept. Whenever a head branches out, a new head is added. When multiple branches merge, their heads are combined. For every head, a virtual memory allocator is used to determine the maximum temporary buffer requirements of that head. Considering the chunking of processing nodes, the memory locations within a memory allocator may be reused when temporary data is not required anymore. Finally, the dependencies between all heads' memory allocators are analyzed and potential reuse among memory is determined. The overall memory requirements for data moving through a graph are determined as the input data, the overlapping temporary memory, and the memory for the output data. These data may be stored in dedicated memory locations.

Figure 5:
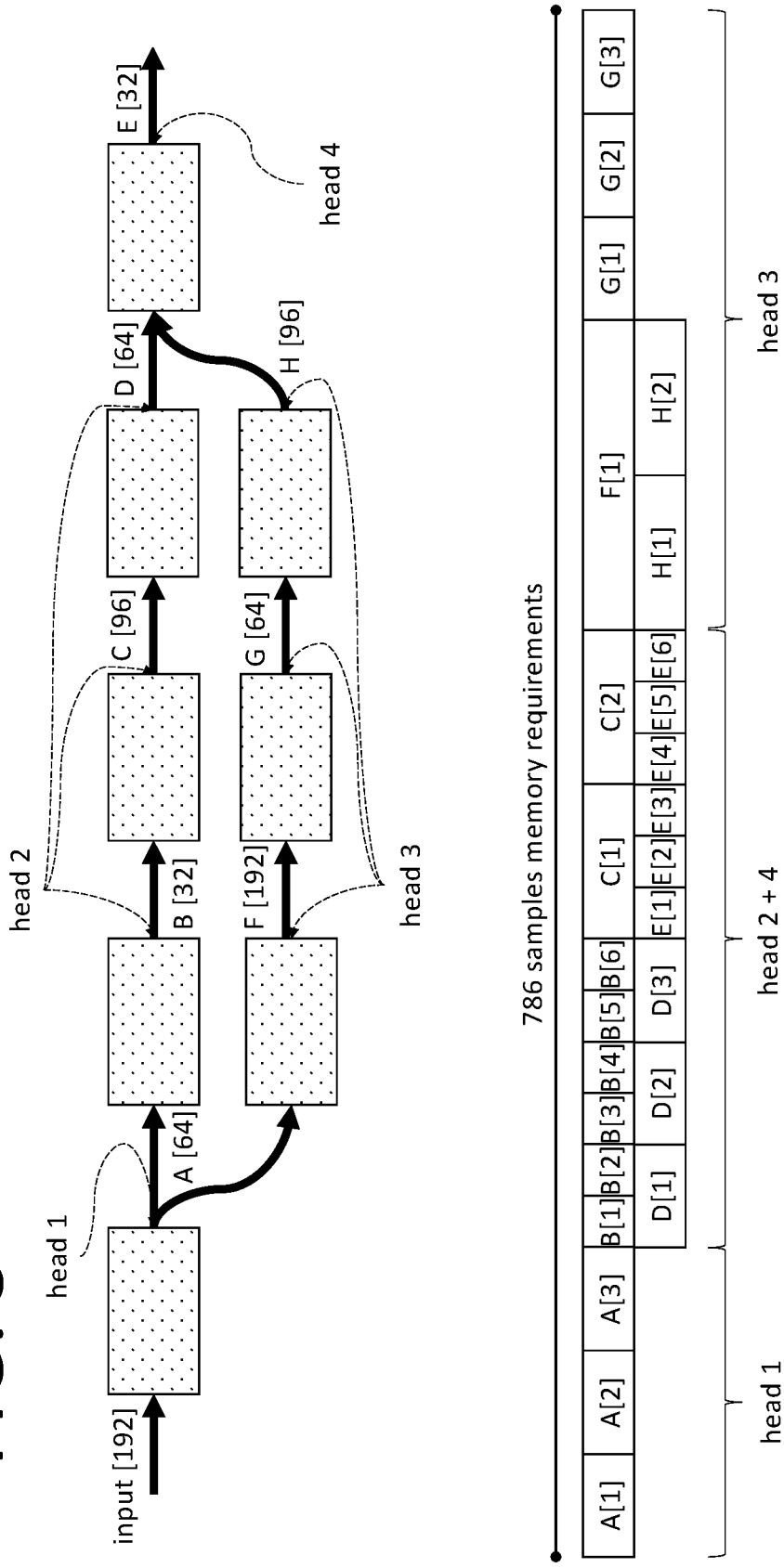
FIG. 5 shows an example of a memory allocation strategy for an apparatus for parallel processing such as that illustrated in FIG. 1, in accordance with some embodiments of the invention.

FIG. 5 illustrates an example of a memory allocation strategy. Each fork and join results in memory allocations happening in different heads. Within each head, allocations ensure that memory for both the input and output buffer are available at the same time. However, for nodes that are not direct neighbors, the allocations may overlap and thus temporary memory may be saved, in this example for B and D, and F and H. A special case is the overlap of C and E, which takes place in different heads. However, a join allows reuse of a previous head for allocations. Note that D[1] may override B[1] and B[2], whereas the scheduler may only just execute B[3], which results in a valid execution. Due to the dependency management, D[2] may only execute after B [4] has been created and consumed by C. Thus, each set of data samples is associated with a virtual memory location in a virtual memory buffer before the processing phase. The virtual memory location considers dependencies between data processors and potentials of parallel execution, and the virtual memory locations may overlap as appropriate to result in minimal memory requirements In the fourth step, the scheduling information, dependencies between tasks and processing nodes, parameter memory requirements, and data pointers may be determined and written to the blueprint. Again, using a queue the blueprint may be generated for one processing node at a time, writing the scheduling blueprint of a processing node only if all blueprints of all processing nodes that create input for this processing node have been written. All nodes that only receive input data for the processing graph may be inserted into the queue first. Processing nodes are taken from the queue and worked on and processing nodes are added to the queue after all their inputs have been processed.

During the creation of a blueprint, the following information may be written into the blueprint for each task:
1. A pointer to the processing node itself to update any state of the processing node;
2. A function pointer for executing the instructions of the task;
3. A launch identifying the call to the graph itself;
4. A multiplicity identifier for the task to identify which instance of the task is being launched;
5. A call identifier to determine on which part of all input data the task is executed on;
6. The local memory requirements to allow the scheduler to allocate shared memory;
7. The number of threads/lanes required for the task to allow the scheduler to allocate the right number of threads/lanes for the task;
8. The number of synchronization barriers required for the task to allow the scheduler to allocate the right number of synchronization barriers;
9. The number of registers required for the tasks to allow the scheduler to allocate the right amount of registers;
10. Other resource requirements of the task that can be dynamically managed by the scheduler, for example texture units, globally allocated shared memory, and/or helper workers;
11. A memory offset relative to the blueprint to an array that holds pointers to all inputs of the processing node;
12. A memory offset relative to the blueprint to an array that holds pointers to all outputs of the processing node;
13. A memory offset relative to the blueprint to an array that holds parameters specifically for this task;
14. A memory offset relative to the blueprint to an array that holds parameters specifically for this processing node;
15. A memory offset relative to the blueprint to an array that holds pointers to other blueprints which are dependent on the outputs of this task;
16. A counter that specifies the length of the previously mentioned array of points to other blueprints which are dependent on the outputs of this task;
17. A counter that specifies the number of tasks this task depends on, which may be atomically reduced by the scheduler to determine when all dependencies of a task are resolved and a task is ready for execution;
18. A priority value that determines the priority of a task; and
19. A launch state identifier that determines which global counter should be increased after the task has completed execution, which allows tracking of the completion of nodes that produce output data of the graph and thus allows determining whether a complete graph has finished execution.

To write the above information for each task, a series of operations may be carried out for each processing node:
1. Memory for the parameters of the processing node may be allocated from the blueprint buffer of the entire graph;
2. Memory for the array of input pointers may be allocated from the blueprint buffer;
3. Memory for the array of output pointers may be allocated from the blueprint buffer;
4. For all pointers, information about their relative placement according to the memory allocator or the location in the flattened graph input buffer and output buffer may be stored in a separate array;
5. Memory for the parameters for all tasks of the processing node may be allocated; and 6. The default parameters for the processing node and tasks may be written to the allocated memories.

For all calls necessary to process the entire input data and for all tasks, the following steps may be carried out:
1. Memory for the task blueprint may be allocated from the blueprint buffer;
2. The dependency counter based on the inputs to the tasks and the previous tasks may be determined and written to the blueprint;
3. The pointers to all above-mentioned buffers (processor node, function, input, output, parameters, etc.) may be written;
4. The basic identifiers such as multiplicity and call identifier may be written;
5. The resource requirements may be written;
6. For all tasks a current task depends upon, information about where these tasks are placed in the blueprint may be stored; and
7. For all values that cannot be determined during the configuration phase, such as the launch identifier, the launch state identifier, the task parameters, or the processing node parameters, their location in the blueprint is recorded such that they can be filled in before executing the graph.

After all blueprints have been written, arrays may be generated that keep information about where information about the blueprint must be added. This includes the aforementioned input, output, and temporary memory pointers, launch identifiers, launch state identifier, task parameters, processing node parameters, pointers to dependencies, or priority. These arrays may be stored as pairs of memory locations in the blueprint and information to be updated. The information may simply refer to the data to be added, e.g., "launch identifier," or local offsets, such as "output buffer +256 bytes." For efficient storage of these data, separate arrays for each type of pair may be stored. Furthermore, for efficient fill-up of the blueprint, those arrays may be sorted according to the fill-up location and thus better memory access during the writing of the data.

In summary, a blueprint of a graph may contain the information required for the execution of each individual task as well as information about where data should be placed in different memory buffers, such as input, output, and temporary buffers, as well which information needs to be updated and where before a blueprint is ready for execution.

4. Graph Meta-Information

For every graph, meta-information may be kept to assist during the processing phase. The meta-information may include data that allows for efficient preparation and combination of graphs right before the actual execution, and may additionally include information about the resource requirements of a graph during execution, predictions about the execution time, as well as the amount of parallelism offered by a graph.

The number of terminal processing nodes, i.e., the number of nodes that will write to output buffers, may be used to quickly determine the number of processing nodes that increase the launch state and thus when all outputs of a graph have been processed. This number may be computed during the configuration state and can be determined from the number of entries that need to write the launch state identifier when turning the blueprint into executable information.

The maximum amount of parallelism offered by a graph may be used to determine to which degree a graph may fill up a parallel computing device like the proposed apparatus and, thus, how many graphs may be executed in parallel. To determine the maximum amount of parallelism, we rely on the computation of parallel heads when determining the required buffer size, as well as the parallelism available in each head, due to parallel execution on different portions of input data for different processing nodes. This computation also includes the multiplicity of tasks, their thread/lane requirements, and the way chunking is carried out.

Other meta-information used includes the required memory for input and output data, the required memory for temporary buffers, and the memory for the complete graph blueprint itself. These data may be used when copying data from a controlling device to the apparatus or when allocating data for the execution of a graph directly on the apparatus. This meta-information may be generated during the configuration stage by keeping track of the intermediate data structures. Additionally, the number of starting tasks, i.e., those tasks that do not depend on any other tasks, and their location in the blueprint may also be precomputed and stored for each graph to efficiently start the execution of a graph.

Further meta-information concerning the maximum resource requirements among all tasks in a graph may also be stored to configure the scheduler during the execution stage. This includes the maximum number of threads/lanes required by a single task, the maximum amount of local shared memory required by a task, the maximum temporary global shared memory required, the maximum size of the register file required by one task, the maximum number of barriers required, etc.

A final important meta-information is the expected execution time, i.e., delay, when a graph is executed on a given apparatus, which allows the scheduler to prioritize the execution and plan the execution. To determine the execution time of a graph, an approach similar to following the multiple heads through the graph may be used. First, each compute node in its basic configuration may be profiled on the apparatus, considering all tasks, all inputs, and their respective sizes, as well as the complete number and dependencies of tasks launched to complete the execution of a compute node. Then, the delay through all heads considering forking and joining in the graph can be considered, as well as, parallelization among the input and output. For every join the maximum delay of all joining branches may be chosen, and the maximum among all outputs determines the expected execution time of the entire graph.

5. Parallel Dependency-Based Scheduler

For the execution phase, a parallel distributed scheduler is described that makes scheduling decisions independently on each multi-processor. The scheduler itself may either be designed in software or hardware and assumes a collaborative pattern, i.e., tasks scheduled for execution complete their work and thus free the resources assigned to them. Scheduling decisions are made during scheduling points when all resources on a multi-processor have been freed and all resources can be distributed anew to tasks that are ready for execution.

To manage tasks that are ready for execution, a set of queues managed in global shared memory 112 on the apparatus 100 are used. The minimal data stored in a queue entry is a pointer to a task descriptor, i.e., a copy of a task blueprint filled with the necessary data. The task descriptor provides all information required for the execution of a task. During a scheduling point, the scheduler on a multi-processor may choose any number of tasks to fill-up the available resources, such as available threads/lanes, local shared memory, barriers, etc. To this end, the scheduler dequeues any number of tasks from the global task queues.

After assigning the available resources to each task, the scheduler executes the function associated with each task with the associated number of threads/lanes and sets information such as the assigned registers, local shared memory, global shared memory, range of synchronization barriers, etc. Further details concerning resource assignments are discussed below. For efficiency reasons, the dispatching information such as thread identifiers, input data pointers, output data pointers, etc., may be compiled into the function to be executed for the task and only the most basic information, such as register file and memory offsets as well as a pointer to the task descriptor may be passed to the function calls via local shared memory.

After the execution of a task, the scheduler reads the number of dependencies of the finished tasks from the task descriptor as well as the location of the pointers to the depending task descriptors. Following the pointers, the dependency counter of each dependent task is atomically reduced by one. If a counter reaches zero, the task is ready to be executed and the scheduler places a pointer to the task descriptor into the appropriate global work queue. Thus, the task may be executed on the same or a different multiprocessor. The work queues support concurrent enqueue and dequeue.

If a launch state identifier is set for the task, the scheduler atomically increases the associated global counter. In this way, the schedulers distributed across all multi-processors can track the progress of executed graphs and determine when execution is finished.

Storing all tasks with different resource requirements in a single task queue would lead to a complicated scheduling process, as a "look at the next task description and only dequeue if still fits the available resources" would interfere with parallel dequeue on all multi-processors, i.e., all schedulers may look at the same task and only one may be able to dequeue it. Thus, the proposed distributed scheduler may use multiple queues to order tasks according to their resource requirements in a hierarchical fashion. For example, threads/lanes may be considered the most important sorting criterion, thus, one queue may be used for each thread count. A second sorting criterion may be the amount of local shared memory needed, and each thread count queue may be duplicated for different ranges of shared memory requirements. A scheduler may first choose to dequeue tasks from queues associated with the largest thread counts and highest local shared memory requirements and then switch to queues of tasks with lower memory requirements as nearly all available memory is assigned. Depending on the use case different queue hierarchies based on resource requirements may be configured.

Another level of queues may consider different priority levels. The proposed scheduler may distinguish between arbitrary priority levels. For example, the highest priority may be used for the processing of tasks associated with graphs that can just be accommodated within a predicted execution time window; for example, in case of audio processing a 1 ms deadline is common for a graph during real-time playback. If the predicted execution latency of a graph is close to 1 ms, all its tasks may be put into the highest priority queues. For graphs that more easily can be delivered within the desired deadline, a normal priority may be chosen. Background operations, e.g., graphs that do not have a deadline, may always be put into low priority queues. The scheduler may try to fill up the available resources using higher priority queues before going to lower priority queues.

Figure 6:
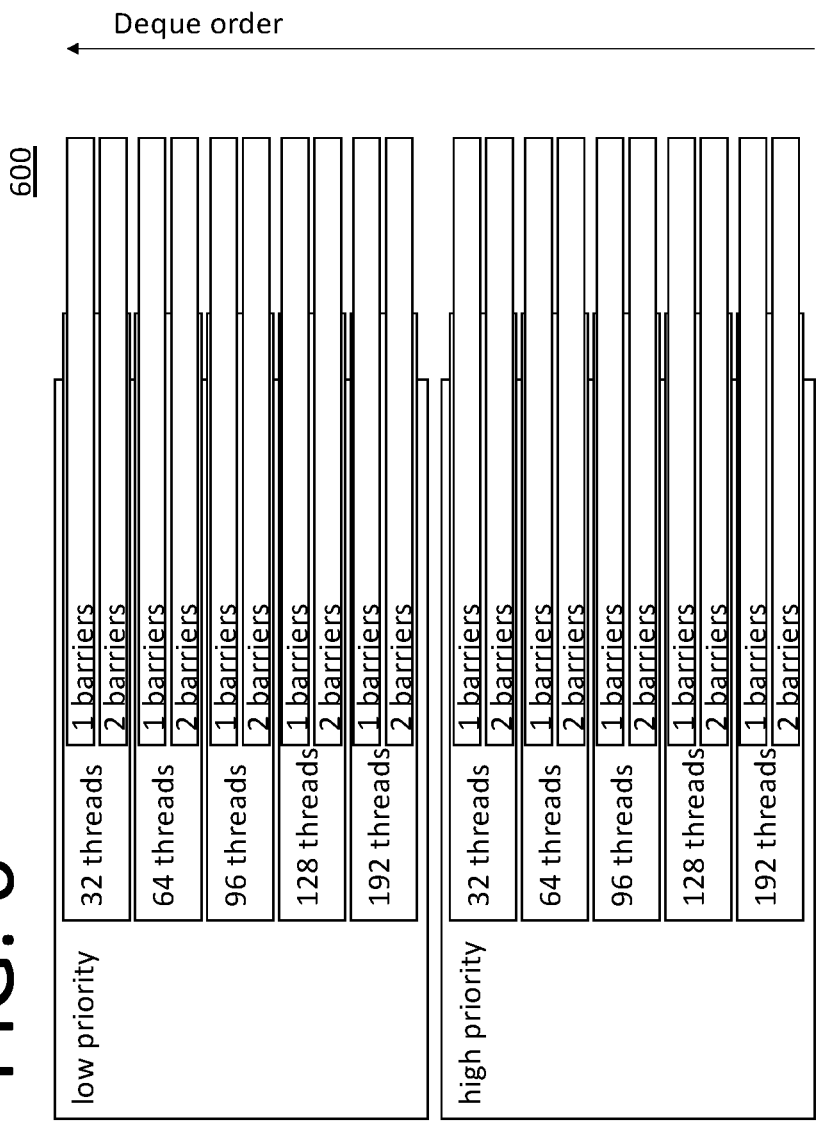
FIG. 6 shows an example of a queue setup for an apparatus for parallel processing such as that illustrated in FIG. 1 capturing different priorities, thread requirements and barrier requirements, in accordance with some embodiments of the invention.

Another sorting criterion may be the execution time of a single task. As the scheduler waits for all resources to become available before going into another scheduling point, it is desirable that all tasks finish execution roughly at the same time. Thus, their expected execution time may be a valid sorting criterion. An example of a potential queuing setup 600 capturing different priorities, thread requirements, and barrier requirements is shown in FIG. 6. The scheduler typically starts to fill up available resources with high priority tasks for high thread counts and high barrier counts, then checks for fewer barrier, and reduced thread counts, etc. Only if no high priority tasks that can operate with the currently available resources can be found does the scheduler switch to lower priority tasks.

When a scheduler fills up the available resources from the queues, it may dequeue multiple tasks at once to increase efficiency. For example, the scheduler may dequeue 16 tasks of 64 threads at once to fill all 1024 available thread slots. Furthermore, for efficiency reasons, the scheduler may skip queues that do not offer tasks that fit into the available resources anymore. For example, if only 96 threads are available, queues for threads counts larger than 96 can immediately be skipped. In various embodiments, the chains or graphs of digital processors may be associated with one or more clients, and each client, graph, or chain may be associated with a processing quota or priority, which may be considered for scheduling.

Figure 7:
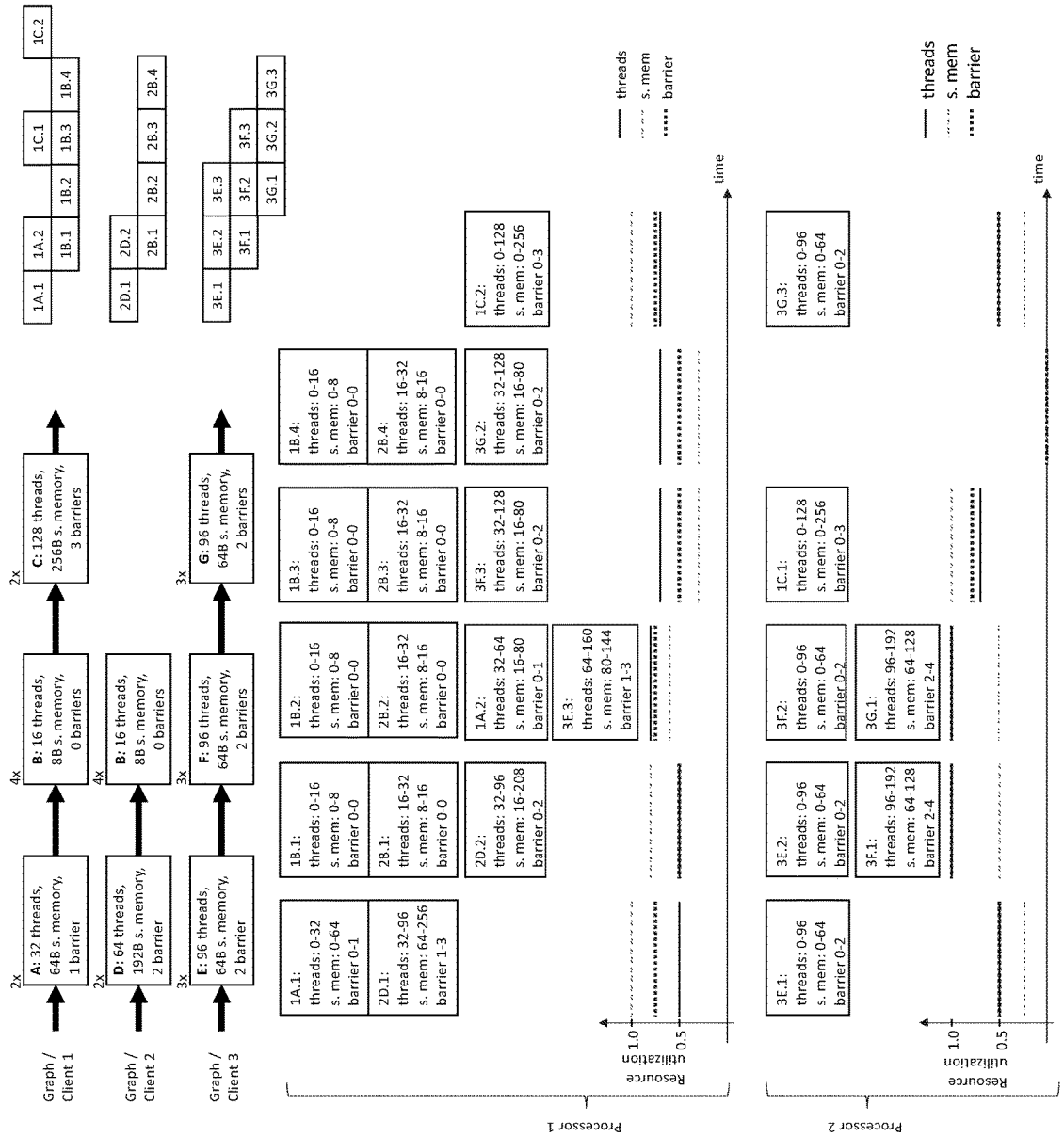
FIG. 7 shows an example of parallel execution on an apparatus for parallel processing with two processors and limited resources on both processors with three graphs being executed concurrently.
Figure 8:
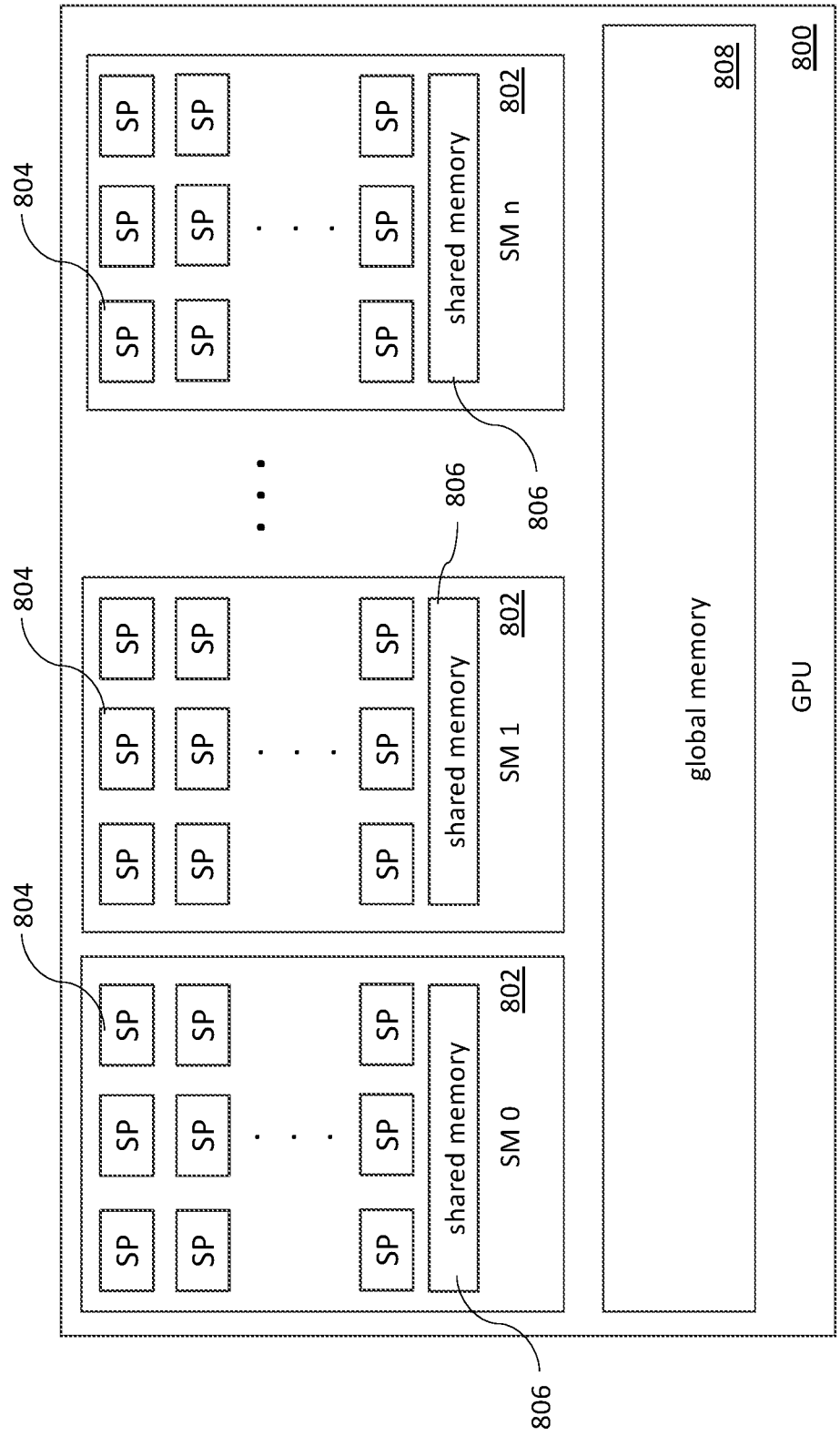
FIG. 8 shows an example of a conventional GPU having a number of SMs, each of which include a number of SPs, and a shared global memory.

A special case of tasks are those whose thread counts are below the SIMD width, i.e., which do not fill up a SIMD core. To avoid thread divergence or disabled lanes, we combine tasks that execute the same instructions, i.e., from the same type and configuration of executions nodes to reach the SIMD width. An example is illustrated in FIG. 7 for parallel execution on an apparatus with two processors and limited resources on both processors with three graphs being executed concurrently. Note that graph 2 has the same processor B as graph 1. At the top right, tasks and their potential execution and parallelization are shown. The bottom part of the illustration shows the realized execution order and the two processors with SIMD width of 32, 192 threads, 256 B of shared memory, and 4 barriers. The graphs on the bottom of each processor timeline show the resource utilization. Note that processing nodes B from graph/client 1 and graph/client 2 are combined to form SIMD-wide execution (indicated by the respective blocks being joined together). Also note that the processing order diverges from the theoretical parallelization scheme on the top right, as the actual available resources on the processors do not allow this amount of parallelization.

To continuously empty queues and not only focus on the queues with the largest resource requirements and thus potentially stall tasks which are placed early in the execution graph but are never chosen due to lower resource requirements, the scheduler may store information about locations from which tasks have been drawn last and continue drawing tasks with lower resource requirements, e.g., linearly iterate through queues with the same priority.

The scheduler overall may have different end conditions, for example, when the execution is stopped or a signal may be sent to another connected device:

1. Out of tasks: all queues are empty and all schedulers have completed execution, i.e., no more tasks can be inserted into queues.
2. Out of time: the scheduler has been running for a certain amount of time or cycles and thus pulses a connected device.
3. Launch state completion: the scheduler detects that a launch state has reached a certain value, i.e., all outputs of one or multiple graphs assigned to a certain launch state identifier have been completed.

6. Continuous Launch Scheduler

To start the execution on the distributed device scheduler, input data from an external source (such as external device 120 in FIG. 1) must be copied to the apparatus for parallel processing 100, the graph blueprint must be filled up, and, after execution, the output data must be copied from the apparatus for parallel processing. Typically, copy requests in synchronization between executions form a bottleneck when processing small tasks with low latency requirements. Launching hundreds of graphs with below 1 ms latency requirements for example may easily be bottlenecked by small memory copies and synchronizations and make it difficult for a scheduler on a parallel device such as the described apparatus for parallel processing to work efficiently.

To this end, embodiments of the present invention combine graphs whose input data arrives at similar points in time or whose results are expected at similar points in time. The execution on the apparatus for parallel processing is discretized into repeating fixed execution intervals, of, for example, 100 microseconds or other time period. Each interval allows for a potential copy to the apparatus for parallel processing or a copy from the apparatus for parallel processing.

Execution requests for graphs arriving within one such interval may be combined into a single copy to the apparatus for parallel processing. The expected execution time for a graph can then be used to determine the expected finish interval and all copies from the apparatus for parallel processing during that interval may be combined. In this way, the number of execution request/communications between the apparatus for parallel processing and an external device (e.g., a host CPU) is limited by the interval and not the number of execution requests arriving.

For the continuous launches on the apparatus for parallel processing, an "out of time"—mode of the scheduler can be used to pulse the associated device (e.g., a host CPU) regularly without relying on a continuous time source on that device. Additionally, when data should be copied from the apparatus for parallel processing, a "launch state completion" mode can be used. All graphs that are supposed to finish within one interval are all assigned the same launch state and the expected launch state result can be communicated to the scheduler. As soon as the number is reached and interval time is spent on the apparatus for parallel processing the associated device (e.g., the host CPU) is signaled. This can immediately trigger a memory copy from the apparatus for parallel processing with the result data for all graphs that have been associated with the interval.

The combination of execution requests relies on the meta-information collected with the blueprint generation. A combined execution request may use a fixed-size memory buffer to increase the efficiency of the combination. Using the meta-information for each graph, memory within the fixed size buffer can be allocated, whereas one can distinguish between data that needs to be transferred from the associated device and to the associated device as well as temporary data. These requests can be served lock-free using atomic operations on the associated device. If the available memory is insufficient, a combined launch for the next interval can be created.

The associated device connected to the apparatus for parallel processing may use the additional meta data to determine the overall available amount of parallelism to control the number of active multi-processors on the apparatus for parallel processing, i.e., the sum of parallelism among all active graphs.

For each incoming request, a dedicated thread on the associated device connected to the apparatus for parallel processing may be used. The thread may determine the next launch interval, query whether a combined launch exists for the interval, and add the launch to that interval. If it succeeds in allocating the required amounts of memory, it may provide information for copying the blueprint of the associated graph into the respective memory locations and fill up the missing information using the available fill up locations. To this end, the locations of the combined input buffer, output buffer, and intermediate buffers need to be known.

The copy of the blueprint and providing the fill-ins may be completed by the thread associated with the request. To this end, the blueprint is copied over to the memory that will be transferred to the apparatus for parallel processing (alongside the input data) and all the fill-ins may be written sequentially. Additionally, all initial tasks of the graph must be enumerated and transferred to the apparatus for parallel processing where they may be initially added to the appropriate work queues.

Alternatively, only the locations of the memory allocations may be transferred alongside the input data to the apparatus for parallel processing and the first task on the apparatus for parallel processing copies the blueprint to the designated memory location and copies over the fill-ins. This task typically can be carried out efficiently on the apparatus for parallel processing with its SIMD design and reduces the processing power required on the associated device.

7. Fat Data

While the previous descriptions focus on low-latency execution, side channel output from processing nodes may include data that does not fall under these tight latency requirements and may comprise large amounts of data, i.e., fat data. Examples of these kinds of data include visual outputs to a user monitoring the processing. In the use case of audio processing, these data may include spectrum data or histograms. These data may only be copied from the apparatus for parallel processing with a lower interval and little to no hard delay requirements, e.g., spectrum data may only be updated and presented to a viewer at 60 frames per second; considering a 1 ms hard latency requirement for a typical audio chain use case, only every 17th call would require copying the fat spectrum data, and delays of about 16+ ms would be acceptable.

Thus, fat data may be copied from the apparatus for parallel processing with some delay to ensure uninterrupted processing by all other graphs. The selection of when fat data should be copied may be triggered by a processor node independently and memory for the fat data copy may be requested from the scheduler. The scheduler may provide continuous memory for all processing nodes in all processing graphs that are combined into a single launch. The copy process from the apparatus for parallel processing of all fat data may be combined into a single call and may only be completed after an unspecified delay.

Furthermore, the scheduler may decide to chunk the copy process of fat data into smaller pieces and schedule the copy operation alongside the copy process of the continuous launches to ensure only little data is copied alongside the regular processing request data. This may be necessary to ensure that the copying of regular data is not delayed and real-time processing of latency critical data is continued uninterruptedly.

Thus, techniques for scheduling repeated processing steps on data streams on parallel processors with a focus on low-latency execution and audio processing have been described. As should be evident, in various embodiments of the invention processors may have or be associated with a limited amount/number of resources, for example register files, shared memory, thread state registers, named barriers, shared caches, etc. Hence, scheduling with respect to data samples stored and associated with priority or execution deadlines may account for not only those priority or execution deadlines but also the availability and/or number of resources required for processing of the samples. Further, the data samples may be organized in queues, and each queue associated with a common or different processor, launch, priority, resource requirement, or state.

What is claimed is:

1. An apparatus for parallel processing, comprising:
a memory; and
one or more processors coupled to the memory, at least one of the one or more processors configured to operate in a single instruction, multiple data (SIMD) model, and the one or more processors configured to:
process a plurality of data samples associated with one or more chains or graphs of data processing operations, the one or more chains or graphs of data processing operations comprising processing steps to be executed repeatedly on first data samples of the plurality of, the first data samples being a subset of temporally ordered samples stored as a pool of sets of the plurality of data samples in the memory, wherein the pool of sets of the plurality of data samples is organized as a hierarchy of queues, each queue in the hierarchy being associated with a different one of the processors, processing priorities of the pluralities of data samples, resource requirements, or processing state of the plurality of data samples, and
dynamically schedule processing of the sets of the plurality of data samples in accordance with the one or more chains or graphs of data processing operations using the hierarchy of queues and according to priority or execution deadlines for the sets of the plurality of data samples and required resources for the processing of the sets of the plurality of data samples, said required resources including one or more of: a number of threads, registers, local shared memory, number of required synchronization barriers, and execution time of processing of the pool of the sets of the plurality data samples by the one or more processors,
wherein the sets of the plurality of data samples are associated with a single one of the one or more chains or graphs of data processing operations or different ones of the one or more chains and graphs of data processing operations, each respective set of the plurality of data samples is of equal or a different number of data samples as others of the sets of the plurality of data samples, and each respective set of the plurality of data samples maps to multiple processing threads executing on the one or more processors configured to operate in the SIMD model and a same or different ones of the processing steps represented by different ones of the data processing operations.

2. The apparatus of claim 1, wherein each of the one or more processors is connected to a limited amount of resources, which resources include some or all of register files, shared memory, thread state registers, named barriers, and shared caches.

3. The apparatus of claim 1, wherein the required resources for the processing of the sets of data samples of the pool include one or more of: a number of threads, registers, local shared memory, number of required synchronization barriers, and execution time.

4. The apparatus of claim 1, wherein the plurality of data samples is associated with a pre-recorded, generated, or live-translated stream of samples forming an audio track.

5. The apparatus of claim 1, wherein the one or more chains or graphs of data processing operations is associated with one or more clients and each client, graph, or chain is associated with a processing quota or priority, which processing quota or priority is considered for scheduling.

6. The apparatus of claim 1, wherein the plurality of data samples is received from at least one of: disc; a remote device; a network; another processor; an external workstation; and a digital audio workstation.

7. The apparatus of claim 1, wherein the sets of the plurality of data samples are associated with respective tasks, the respective tasks use thread counts smaller than a SIMD width of the one or more processors, and multiple ones of the sets of the plurality of data samples for each common task are combined to reach the SIMD width of the one or more processors.

8. The apparatus of claim 1, wherein information about the graphs and chains of data processing operations is computed upon changes to the graphs or data processing operations and processing of the plurality of data samples is divided into a configuration phase and an execution phase.

9. The apparatus of claim 8, wherein the changes to the graphs or data processing operations include one or more of: addition or deletion of data processors, input or output connection changes between data processors being altered, changes to a data processor's task being made, and a number of tasks being altered.

10. The apparatus of claim 8, wherein during the configuration phase, a possible execution of ones of the plurality of data samples and their flow through the graph or chain of data processing operations is split into parallel and sequential processing operations, creating a dependency graph of tasks and data samples, the sets of the plurality of data samples being associated with samples being made available as inputs to the graph or chain of data processing operations or only becoming available after processing of a task associated with one or more of the data processors.

11. The apparatus of claim 1, wherein the dynamic scheduling includes determining per-chain or per-graph processing blueprints that include information concerning a configuration phase of the dynamic scheduling and information concerning memory locations for data associated with each task of each data processor prior to executing a processing phase of the dynamic scheduling.

12. The apparatus of claim 11, wherein the processing blueprints include task information, input and output data locations, task and data processor parameters and resource requirements, and task dependency pointers and counters for the processing phase.

13. The apparatus of claim 12, wherein the one or more chains or graphs of data processing operations are associated with one or multiple threads executing on a secondary processor communicably coupled to the apparatus to allocate memory on the secondary processor and on the apparatus to produce executable descriptions from the processing blueprints and insert incoming ones of the plurality of data samples into the executable descriptions.

14. The apparatus of claim 13, wherein each of the one or multiple threads associates one or more of the executable descriptions with a processing step of the processing phase.

\* \* \* \* \*